United States Patent
Kurata

(10) Patent No.: US 10,298,847 B2
(45) Date of Patent: May 21, 2019

(54) IMAGE STABILIZATION DEVICE, IMAGE STABILIZATION METHOD, AND ELECTRONIC APPARATUS

(71) Applicant: SONY MOBILE COMMUNICATIONS INC., Tokyo (JP)

(72) Inventor: Tohru Kurata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 154 days.

(21) Appl. No.: 15/448,897

(22) Filed: Mar. 3, 2017

(65) Prior Publication Data

US 2017/0272656 A1  Sep. 21, 2017

(30) Foreign Application Priority Data

Mar. 17, 2016  (JP) ................. 2016-053247

(51) Int. Cl.
  *G03B 5/00* (2006.01)
  *G02B 27/64* (2006.01)
  *H04N 5/232* (2006.01)

(52) U.S. Cl.
  CPC ....... *H04N 5/23267* (2013.01); *G02B 27/646* (2013.01); *H04N 5/23248* (2013.01); *H04N 5/23287* (2013.01); *H04N 5/23293* (2013.01); *G03B 5/00* (2013.01); *G03B 2205/0015* (2013.01); *G03B 2207/005* (2013.01); *G03B 2217/005* (2013.01)

(58) Field of Classification Search
  USPC ...................................... 348/208.5
  See application file for complete search history.

(56) References Cited

U.S. PATENT DOCUMENTS

| 7,385,632 | B2 * | 6/2008 | Shinohara | .......... | H04N 5/23203 |
| | | | | | 348/208.16 |
| 7,711,253 | B2 * | 5/2010 | Tomita | ............... | H04N 5/23212 |
| | | | | | 348/208.5 |
| 9,025,039 | B2 * | 5/2015 | Katoh | ................ | H04N 5/23267 |
| | | | | | 348/208.12 |
| 2006/0033817 | A1 | 2/2006 | Ishikawa et al. | | |
| 2010/0141799 | A1 | 6/2010 | Yamashita et al. | | |
| 2013/0235220 | A1 * | 9/2013 | Williams | .......... | H04N 5/23264 |
| | | | | | 348/208.1 |
| 2015/0281581 | A1 | 10/2015 | Sakurai et al. | | |

FOREIGN PATENT DOCUMENTS

| JP | 10-51699 A | 2/1998 |
| JP | 4618370 | 1/2011 |

OTHER PUBLICATIONS

Extended European Search Report dated Jul. 10. 2017 in Patent Application No. 17157225.8.

* cited by examiner

*Primary Examiner* — Twyler L Haskins
*Assistant Examiner* — Quan Pham
(74) *Attorney, Agent, or Firm* — Xsensus LLP

(57) ABSTRACT

There is provided an image stabilization device including: a control unit configured to perform first camera shake correction processing based on an optical camera shake correction method using a lens and second camera shake correction processing based on an electronic camera shake correction method of cutting out a captured image.

10 Claims, 11 Drawing Sheets

IMAGE STABILIZATION DEVICE, IMAGE STABILIZATION METHOD, AND ELECTRONIC APPARATUS

CROSS REFERENCE TO RELATED APPLICATIONS

This application claims the benefit of Japanese Priority Patent Application JP 2016-053247 filed Mar. 17, 2016, the entire contents of which are incorporated herein by reference.

BACKGROUND

The present disclosure relates to an image stabilization device, an image stabilization method, and an electronic apparatus.

When an imaging device executes imaging processing in a state where an imaging person holds the imaging device with the hand, disorder or an image may occur due to a camera shake. Hence, the imaging device is provided with a camera shake correction function. There are two common types of camera shake correction methods, namely, an optical method (optical image stabilization, OIS) and an electronic method (electrical image stabilization, EIS).

During the imaging of moving images and during the continuous imaging of still images, a camera shake correction function in which optical camera shake correction and electronic camera shake correction are combined may be used. For example, as described in JP 4618370B below, there is a technology in which the camera shake correction processing in the exposure time of one frame (in-plane correction) is performed by optical camera shake correction and the camera shake correction processing in the period other than the exposure time (inter-plane correction) is performed by electronic camera shake correction.

SUMMARY

However, in the case where the in-plane correction is performed by optical camera shake correction and the inter-plane correction is performed by electronic camera shake correction, there is a case where the in-plane correction by optical camera shake correction cannot be performed favorably, depending on imaging conditions such as the exposure time.

Thus, an embodiment of the present disclosure proposes a new and improved image stabilization device, a new and improved image stabilization method, and a new and improved electronic apparatus that can achieve favorable camera shake correction.

According to an embodiment of the present disclosure, there is provided an image stabilization device including: a control unit configured to perform first camera shake correction processing based on an optical camera shake correction method using a lens and second camera shake correction processing based on an electronic camera shake correction method of cutting out a captured image. In a case where an exposure time satisfies a condition, the control unit operates in a first camera shake correction mode in which a centering operation of returning the lens to a center position at a time point of start of each frame is performed in a period other than the exposure time and then the first camera shake correction processing is performed in the exposure time, and the second camera shake correction processing is performed in the period other than the exposure time, and in a case where the exposure time does not satisfy the condition, the control unit operates in a second camera shake correction mode different from the first camera shake correction mode.

Further, according to an embodiment of the present disclosure, there is provided an image stabilization method including: assessing whether an exposure time satisfies a condition or not; and in a case of satisfying the condition, operating in a first camera shake correction mode in which a centering operating of returning a lens to a center position at a time point of start of each frame is performed in a period other than the exposure time and then first camera shake correction processing based on an optical camera shake correction method using the lens is performed in the exposure time, and second camera shake correction processing based on an electronic camera shake correction method of cutting out a captured image is performed in the period other than the exposure time, and in a case of not satisfying the condition, operating in a second camera shake correction mode different from the first camera shake correction mode.

Further, according to an embodiment of the present disclosure, there is provided an electronic apparatus including: the image stabilization device.

As described above, according to an embodiment of the present disclosure, a new and improved image stabilization device, a new and improved image stabilization method, and a new and improved electronic apparatus that can achieve favorable camera shake correction can be provided.

Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Figure 1:
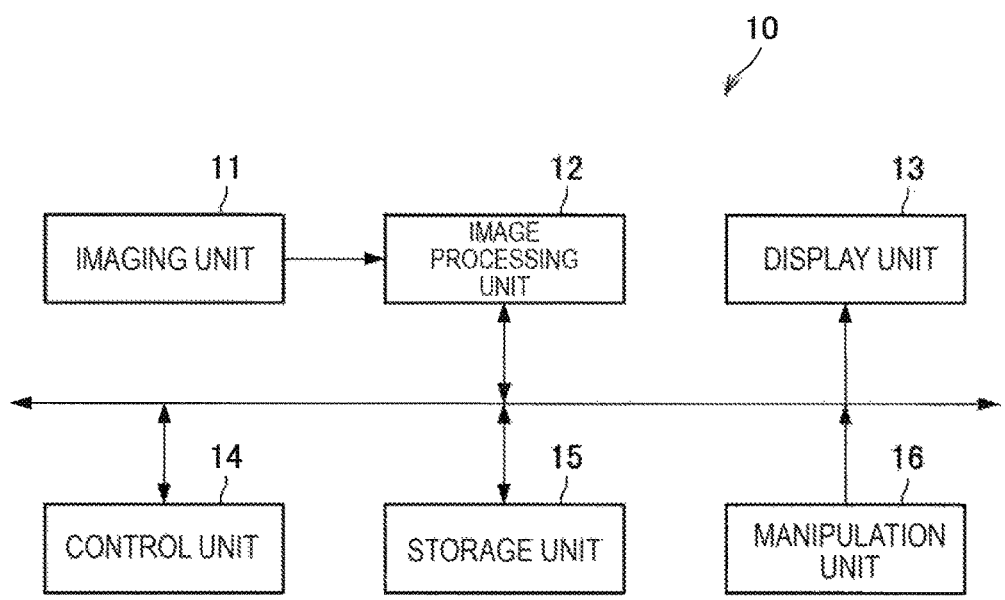
FIG. 1 is an illustration diagram showing an example of the functional configuration of an electronic apparatus 10 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description is give in the following order.
1. Embodiment of the present disclosure
1.1. Overview
1.2 Example of configuration
1.3 Examples of operation
2. Conclusions <1. Embodiment of the present disclosure>

[1.1. Overview]

Before describing an embodiment of the present disclosure in detail, first an overview of the embodiment of the present disclosure is described.

As described above, when an imaging device executes imaging processing in a state where an imaging person holds the imaging device with the hand, disorder of an image may occur due to a camera shake. Hence, the imaging device is provided with a camera shake correction function. There are two common types of camera shake correction methods, namely, an optical method (OIS) and an electronic method (EIS). The OIS is a method that moves a lens or an image sensor and thereby cancels the camera shake, and the EIS is a method that records an image with a shift in accordance with the amount of movement and thereby makes the shake of the subject seem to have disappeared.

During the imaging of moving images and during the continuous imaging of still images, a camera shake correction function in which optical camera shake correction and electronic camera shake correction are combined may be used. In the case where optical camera shake correction and electronic camera shake correction are combined, there is a concept that optical camera shake correction is used as the main function and electronic camera shake correction is used as a secondary function. More specifically, this is a concept that optical camera shake correction is made to be performed continuously at all times in accordance with a signal of a gyro sensor or the like, and electronic camera shake correction is performed only when the correction angle of the optical camera shake correction is not enough and when the correction in the rolling direction, in which the optical camera shake correction cannot make correction, is performed.

On the other hand, there is a technology in which the camera shake correction processing in the exposure time of one frame (in-plane correction) is performed by optical camera shake correction and the camera shake correction processing in the period other than the exposure time (inter-plane correction) is performed by electronic camera shake correction.

In the case where optical camera shake correction is used as the main camera shake correction processing regardless of whether it is for the in-plane correction of the inter-plane correction, it is necessary to solve the following issues.

The first is that optical camera shake correction is physical correction and is therefore limited to real-time control.

These days, also a technology that has achieved a significant improvement in camera shake correction performance is disclosed. For example, JP 2013-258468A discloses a technology in which a shift in the future in terms of time is observed and correction is made a little later with a delay. However, the reason why this technology can be implemented is that this is not optical camera shake correction, for which real-time control is essential, but electronic camera shake correction.

The second is that optical camera shake correction has a physical correction end; although upon reaching the correction end it is necessary to compensate the remaining balance of correction by electronic camera shake correction, the remaining balance of correction cannot be found accurately. In optical camera shake correction, the processing of controlling a vibration-proof lens in accordance with a signal of a gyro sensor is performed. In practice, the processing of performing feedback control by observing the position of a vibration-proof lens using a Hall element that detects magnetic force is performed.

This feedback control enables stable braking provided that it is performed for a relatively long time. However, at the time of ever-changing vibration like a camera shake, unstable behavior is exhibited at all times, and there are also an error, processing delay, etc. of the dynamic Hall element; hence, it is difficult to acquire the position of the vibration-proof lens at a certain moment accurately. Consequently, even if it is attempted to, upon reaching the correction end, compensate the remaining balance of correction by electronic camera shake correction, the correction performance is poor.

On the other hand, in the case where optical camera shake correction and electronic camera shake correction are clearly assigned to in-plane and inter-plane, respectively, a centering operation that returns the vibration-proof lens to the center position before the start of exposure is performed for each frame. By the centering operation, the events described above are less likely to occur. Electronic camera shake correction is free from the influence of optical camera shake correction, and may be performed in accordance with a signal from the gyro sensor at all times.

Furthermore, by performing the centering operation for each frame, the vibration-proof lens is always located in the center position at the time point of the start of the exposure of each frame. Thereby, there is an advantage that the performance of in-plane blur correction by optical camera shake correction is exhibited to the fullest, and there is also an advantage of working in favor of the correction of rolling shutter distortion peculiar to CMOS image sensors.

However, in the case where a long exposure time is needed, such as in imaging in dark places, the time for the centering operation is shortened, and it is difficult to return the vibration-proof lens to the center position before the start of exposure. That is, in the case where the in-plane correction is performed by optical camera shake correction and the inter-plane correction is performed by electronic camera shake correction, there is a case where the in-plane correction cannot be performed favorably, depending on imaging conditions such as the exposure time.

Thus, in view of the issues described above, the present discloser conducted extensive studies on technology by which camera shake correction processing can be performed favorably in the case where the in-plane correction is performed by optical camera shake correction and the inter-plane correction is performed by electronic camera shake correction. As a result, the present discloser has developed a technology by which camera shake correction processing can be performed favorably in the case where the in-plane correction is performed by optical camera shake correction and the inter-plane correction is performed by electronic camera shake correction, as described below.

In the above, an overview of an embodiment of the present disclosure is described.

[1.2. Example of Functional Configuration]

Next, an example of the functional configuration of an electronic apparatus according to an embodiment of the present disclosure is described. FIG. 1 is an illustration diagram showing an example of the functional configuration of an electronic apparatus 10 according to an embodiment of the present disclosure. An example of the functional configuration of the electronic apparatus 10 according to an embodiment of the present disclosure will now be described using FIG. 1.

As shown in FIG. 1, the electronic apparatus 10 according to an embodiment of the present disclosure is configured to include an imaging unit 11, an image processing unit 12, a display unit 13, a control unit 14, a storage unit 15, and a manipulation unit 16.

The imaging unit 11 is configured to include a lens, a sensor module, etc., and stores electrons for a prescribed period in accordance with the image formed on the light receiving surface of the sensor module through the lens. The imaging unit 11 performs prescribed signal processing on a signal in accordance with the stored electrons. Then, the imaging unit 11 outputs the signal that has undergone signal processing to the image processing unit 12. The configuration of the sensor module included in the imaging unit 11 is described in detail later.

The imaging unit 11 may execute, as the prescribe signal processing mentioned above, signal processing such as camera shake correction processing based on the optical camera shake correction method or the electronic camera shake correction method, automatic white balance processing, automatic exposure processing, distortion correction processing, defect correction processing, noise reduction processing, and high dynamic range imaging processing.

The image processing unit 12 is formed of, for example, an application processor (AP), and executes image processing using a signal outputted from the imaging unit 11. Examples of the image processing executed by the image processing unit 12 include demosaic processing using a signal outputted from the imaging unit 11, display processing of an image after demosaic processing on the display unit 13, storage processing on the storage unit 15, etc. The image processing unit 12 may perform electronic camera shake correction processing.

The display unit 13 is a display device formed of, for example, a liquid crystal display, an organic EL display, or the like. The display content of the display unit 13 is controlled by the control unit 14. For example, on the basis of the control of the control unit 14, the display unit 13 displays an image that is captured by the imaging unit 11 and has undergone image processing by the image processing unit 12.

The control unit 14 is formed of, for example, a processor such as a central processing unit (CPU), a ROM, a RAM, etc., and controls the operation of each part of the electronic apparatus 10.

The storage unit 15 is formed of, for example, a storage medium such as a nonvolatile memory, such as a flash memory. The storage unit 15 stores an image that is captured by the imaging unit 11 and has undergone image processing by the image processing unit 12. The image stored in the storage unit 15 may be displayed on the display unit 13 in accordance with the manipulation by the user of the electronic apparatus 10.

The manipulation unit 16 is a device for the manipulation of the electronic apparatus 10, and is formed of, for example, buttons, a touch panel, etc. In the case where the manipulation unit 16 includes a touch panel, the touch panel is provided on the display surface of the display unit 13. When the user of the electronic apparatus 10 intends to record an image captured by the imaging unit 11 in the electronic apparatus 10, the user manipulates a specific button of the manipulation unit 16 to bring about a shutter trigger. On sensing the occurrence of a shutter trigger, the imaging unit 11 and the image processing unit 12 execute processing for recording an image in accordance with the occurrence of the shutter trigger in the electronic apparatus 10.

The electronic apparatus 10 shown in FIG. 1 is not limited to a specific apparatus, and may have various forms, such as a digital camera, a smartphone, a tablet-type mobile terminal, a mobile music playing device, and a game machine.

In the above, an example of the functional configuration of the electronic apparatus 10 according to an embodiment of the present disclosure is described. Next, an example of the configuration of the imaging unit 11 of the electronic apparatus 10 according to an embodiment of the present disclosure is described.

Figure 2:
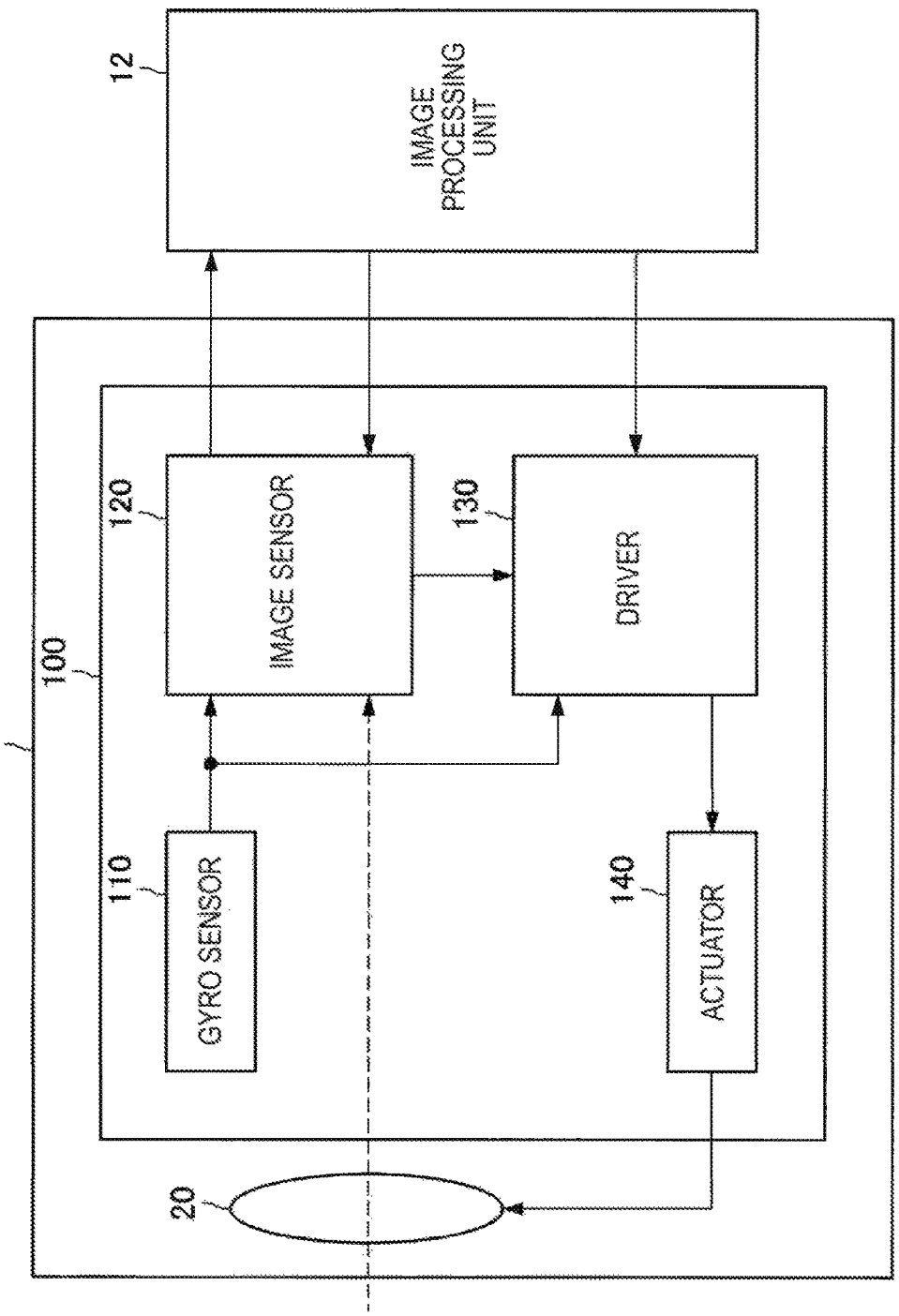
FIG. 2 is an illustration diagram showing an example of the configuration of an imaging unit 11 according to the embodiment.

FIG. 2 is an illustration diagram showing an example of the configuration of the imaging unit 11 according to an embodiment of the present disclosure. An example of the configuration of the imaging unit 11 according to an embodiment of the present disclosure will now be described using FIG. 2.

As shown in FIG. 2, the imaging unit 11 according to an embodiment of the present disclosure is configured to include a lens unit 20 and a sensor module 100. The sensor module 100 is configured to include a gyro sensor 110, an image sensor 120, a driver 130, and an actuator 140.

The lens unit 20 is a lens group for causing a subject image to be formed on the imaging surface of the image sensor. The lens unit 20 includes, in order to perform optical camera shake correction, a vibration-proof lens of which the position is moved by a signal from the actuator 140. The position of the vibration-proof lens is moved in two axial directions orthogonal to the optical axis by a signal from the actuator 140, for example.

The gyro sensor 110 is a sensor that detects the posture of the electronic apparatus 10, and outputs sensing data to the driver 130.

The image sensor 120 is formed of a complementary metal oxide semiconductor (CMOS) device or a charge-coupled device (CCD). In this embodiment, a description is given on the assumption that the image sensor 120 is a CMOS device. In the image sensor 120, light sensors are arranged in a matrix configuration on a semiconductor substrate, and a subject image coming through the lens unit 20 is detected and a signal charge is generated. The image sensor 120 reads the generated signal charge via a vertical signal line and a horizontal signal line, and performs signal processing on the signal in its interior and outputs the signal to the image processing unit 12 in a later stage. In the case where the image sensor 120 is a CMOS device, exposure control is performed with a global shutter and a rolling shutter as electronic shutters. Exposure control is performed by, for example, the image processing unit 12. The image sensor 120 may have a stacked structure in which a plurality of semiconductor substrates are stacked.

The driver 130 performs, by the control of the image processing unit 12, the operation control of the actuator 140 based on the sensing data from the gyro sensor 110, for example. In this embodiment, in the exposure time, the driver 130 performs the operation control of the actuator 140 on the basis of the sensing data from the gyro sensor 110; and in the period other than the exposure time, the driver 130 performs the centering operation of the vibration-proof lens, that is, performs the operation control of the actuator 140 so that the vibration-proof lens moves to the center position.

The actuator 140 performs the control of moving the position of the vibration-proof lens on the basis of the operation control by the driver 130. In this embodiment, in the exposure time, the actuator 140 performs the control of moving the position of the vibration-proof lens on the basis of the operation control from the driver 130; and in the period other than the exposure time, the actuator 140 performs control for the centering operation of the vibration-proof lens on the basis of the operation control from the driver 130.

The imaging unit 11 according to an embodiment of the present disclosure has a configuration like that shown in FIG. 2; thus, when performing camera shake correction processing, the imaging unit 11 performs optical camera shake correction as the camera shake correction in the exposure time of each frame (in-plane correction), and performs, in the period other than the exposure time, the centering operation and electronic camera shake correction as the camera shake correction in the period other than the exposure time (inter-plane correction). The electronic camera shake correction processing may be performed by a circuit formed on a substrate included in the image sensor 120, or the electronic camera shake correction processing may be performed by the image processing unit 12 in a later stage.

As described above, in the case where optical camera shake correction is performed as the in-plane correction and electronic camera shake correction is performed as the inter-plane correction, there is a case where the centering operation cannot be completed in the period other than the exposure time, depending on the condition of the exposure time.

Thus, in the case where the centering operation cannot be completed in the period other than the exposure time due to the condition of the exposure time, the imaging unit 11 according to an embodiment of the present disclosure performs camera shake correction processing by an operation different from the camera shake correction processing that performs optical camera shake correction as the in-plane correction and performs electronic camera shake correction as the inter-plane correction.

Thus, by changing the content of camera shake correction processing in accordance with the condition of the exposure time, the imaging unit 11 according to an embodiment of the present disclosure can achieve favorable camera shake correction. Details of the operation of the imaging unit 11 are described in detail later.

Figure 3:
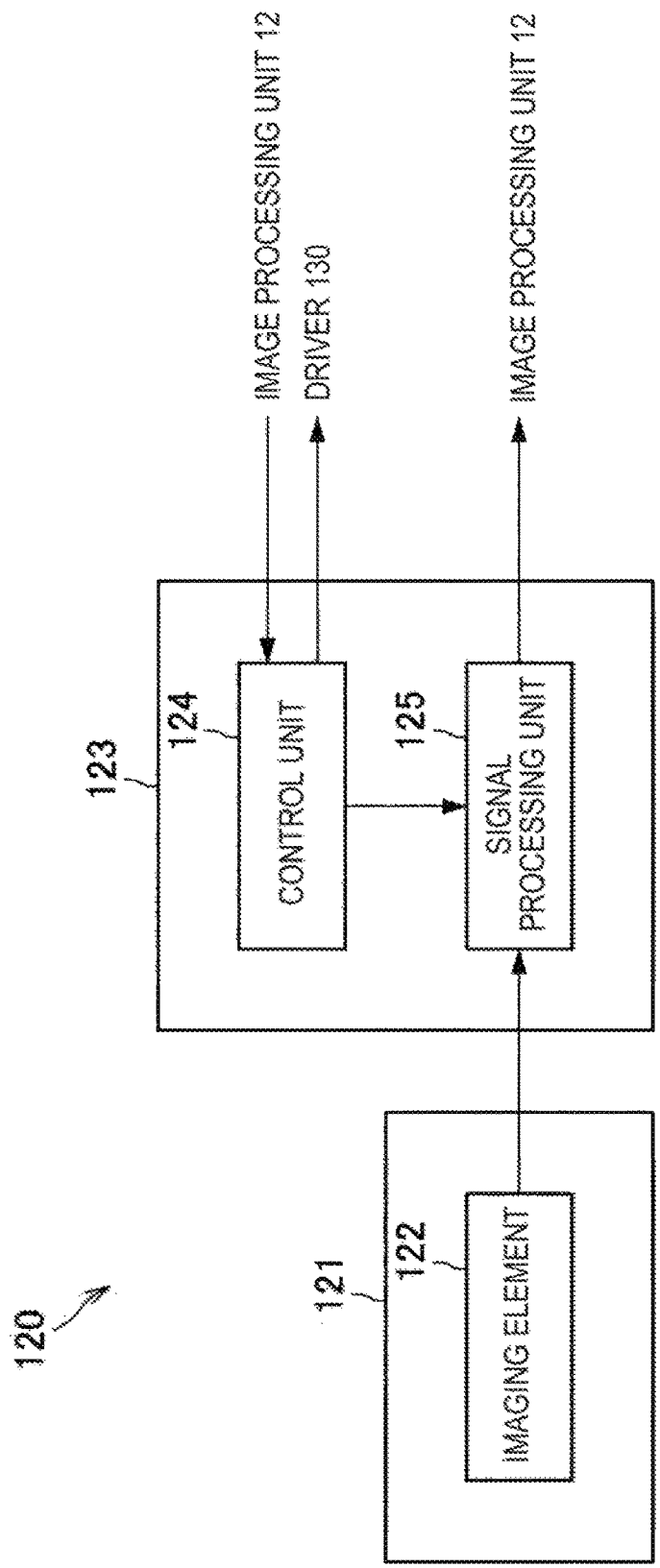
FIG. 3 is an illustration diagram showing an example of the configuration of an image sensor 120 according to the embodiment.

Next, an example of the configuration of the image sensor 120 according to an embodiment of the present disclosure is described. FIG. 3 is an illustration diagram showing an example of the configuration of the image sensor 120 according to an embodiment of the present disclosure.

As shown in FIG. 3, the image sensor 120 according to an embodiment of the present disclosure includes a pixel substrate 121 and a signal processing substrate 123. The pixel substrate 121 and the signal processing substrate 123 may be formed on the same flat surface, or may be formed so as to be stacked.

The pixel substrate 121 includes an imaging element 122 formed of a pixel area in which unit pixels are formed in an array configuration. A pixel signal outputted by the imaging element 122 is sent to the signal processing substrate 123.

The signal processing substrate 123 includes a control unit 124 and a signal processing unit 125.

On the basis of a signal sent from the image processing unit 12, the control unit 124 instructs the signal processing unit 125 to perform signal processing on a pixel signal, and outputs a signal to the driver 130 in order to control the operation of the actuator 140, for example. The control unit 124 receives a signal related to the information of the exposure time from the image processing unit 12, for example.

The signal processing unit 125 performs signal processing on a pixel signal outputted by the imaging element 122, and outputs the signal after processing to the image processing unit 12. The signal processing unit 125 may perform camera shake correction processing based on the electronic camera shake correction method, for example.

The control unit 124 outputs a signal to the driver 130 so as to perform optical camera shake correction as the in-plane correction and perform electronic camera shake correction as the inter-plane correction. However, in the case where, with reference to the information of the exposure time sent from the image processing unit 12, it is found that the centering operation cannot be completed in the period other than the exposure time due to the condition of the exposure time, the driver 130 and the signal processing unit 125 are caused to operate so as to perform camera shake correction processing by an operation different from the camera shake correction processing that performs optical camera shake correction as the in-plane correction and performs electronic camera shake correction as the inter-plane correction.

By the execution of an operation like that described above by the control unit 124, the image sensor 120 according to an embodiment of the present disclosure can achieve favorable camera shake correction.

[1.3. Examples of Operation]

Next, examples of the operation of the imaging unit 11 according to an embodiment of the present disclosure are described.

Figure 4:
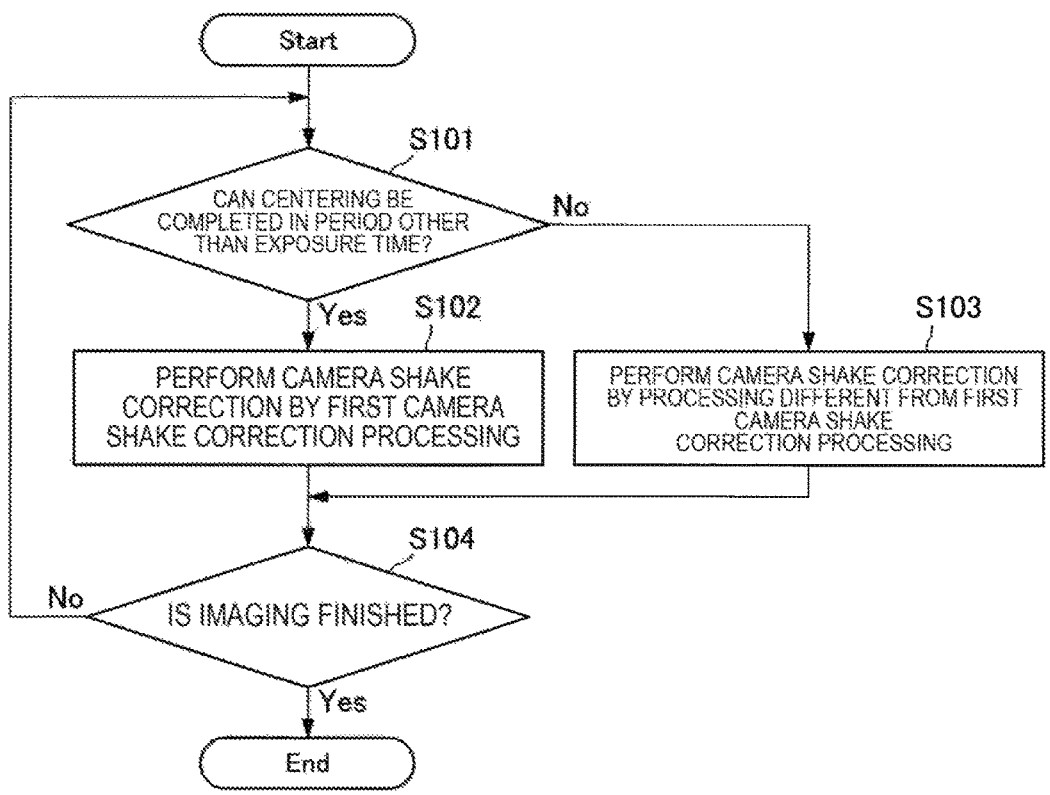
FIG. 4 is a flow chart showing an example of the operation of the imaging unit 11 according to the embodiment.

FIG. 4 is a flow chart showing an example of the operation of the imaging unit 11 according to an embodiment of the present disclosure. What is shown in FIG. 4 is an example of the operation of the imaging unit 11 at the time of, during imaging processing, executing camera shake correction processing in which optical camera shake correction and electronic camera shake correction are combined. An example of the operation of the imaging unit 11 according to an embodiment of the present disclosure will now be described using FIG. 4.

When executing camera shake correction processing, the imaging unit 11 usually performs camera shake correction processing that performs optical camera shake correction as the in-plane correction, then performs the centering operation of the vibration-proof lens in the period other than the exposure time, and performs electronic camera shake correction as the inter-plane correction. This camera shake correction processing may be referred to as first camera shake correction processing.

During the execution of the first camera shake correction processing, based on a change in exposure time or the like, the imaging unit 11 assesses whether the completion of the centering of the vibration-proof lens is possible in the period other than the exposure time or not (step S101). The assessment processing of step S101 is executed by, for example, the control unit 124.

In the case where the result of assessment of step S101 above shows that the completion of the centering of the vibration-proof lens is possible in the period other than the exposure time (Yes in step S101), subsequently the imaging unit 11 executes camera shake correction by the first camera shake correction processing (step S102).

On the other hand, in the case where the result of assessment of step S101 above shows that the completion of the centering of the vibration-proof lens is not possible in the period other than the exposure time (No in step S101), subsequently the imaging unit 11 executes camera shake correction by processing of which the content is different from the first camera shake correction processing (second camera shake correction processing) (Step S103).

The second camera shake correction processing that the imaging unit executes in the case where the completion of the centering of the vibration-proof lens is not possible in the period other than the exposure time will now be described with three examples in this embodiment.

First, a first example of the second camera shake correction processing is described.

Figure 5:
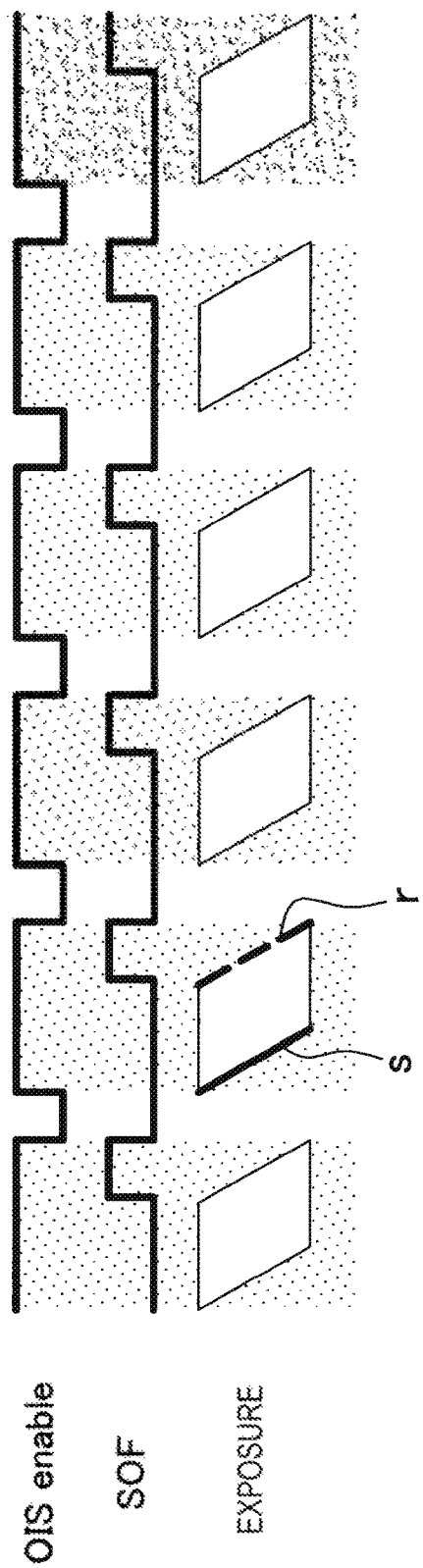
FIG. 5 is an illustration diagram showing an overview of first camera shake correction processing.

FIG. 5 is an illustration diagram showing an overview of the first camera shake correction processing. The imaging element 122 generates a pixel signal by repeating a shutter s and a read r in each frame. OIS Enable is a signal showing the execution and stop of optical camera shake correction, and means that optical camera shake correction is executed in the case of High and optical camera shake correction is stopped in the case of Low. SOF is a signal showing the stop of the exposure of the image sensor 120 in each frame, and shows that, in the case of High, exposure is stopped and data are read from the image sensor 120.

In the case of executing the first camera shake correction processing, at the timing of, in the exposure time, the fall of signal SOF showing the finish of exposure, the image sensor 120 changes signal OIS Enable showing the execution and stop of optical camera shake correction from High to Low, and outputs a signal to the driver 130. In the period in which OIS Enable is Low, the actuator 140 is put into operation by the driver 130 to perform the centering operation of the vibration-proof lens, and electronic camera shake correction is performed by, for example, the image sensor 120.

Figure 6:
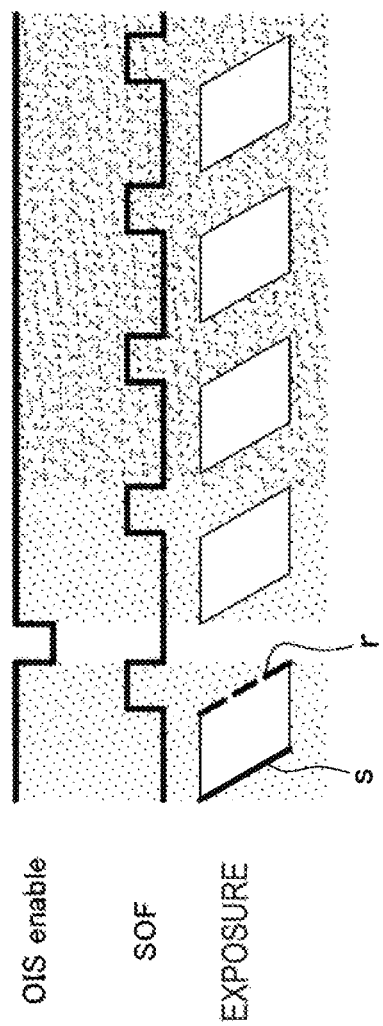
FIG. 6 is an illustration diagram showing an overview of a first example of second camera shake correction processing.

FIG. 6 is an illustration diagram showing an overview of the first example of the second camera shake correction processing of which the content is different from the first camera shake correction processing. In the case where the completion of the centering of the vibration-proof lens is not possible in the period other than the exposure time, the image sensor 120 keeps OIS Enable at High even at the timing of the fall of signal SOF showing the finish of exposure. That is, in the second camera shake correction processing shown herein, optical camera shake correction is continued even in the period other than the exposure time, and electronic camera shake correction is performed in an auxiliary manner when a camera shake that is large enough to exceed the driving range of the vibration-proof lens has occurred.

Figure 7:
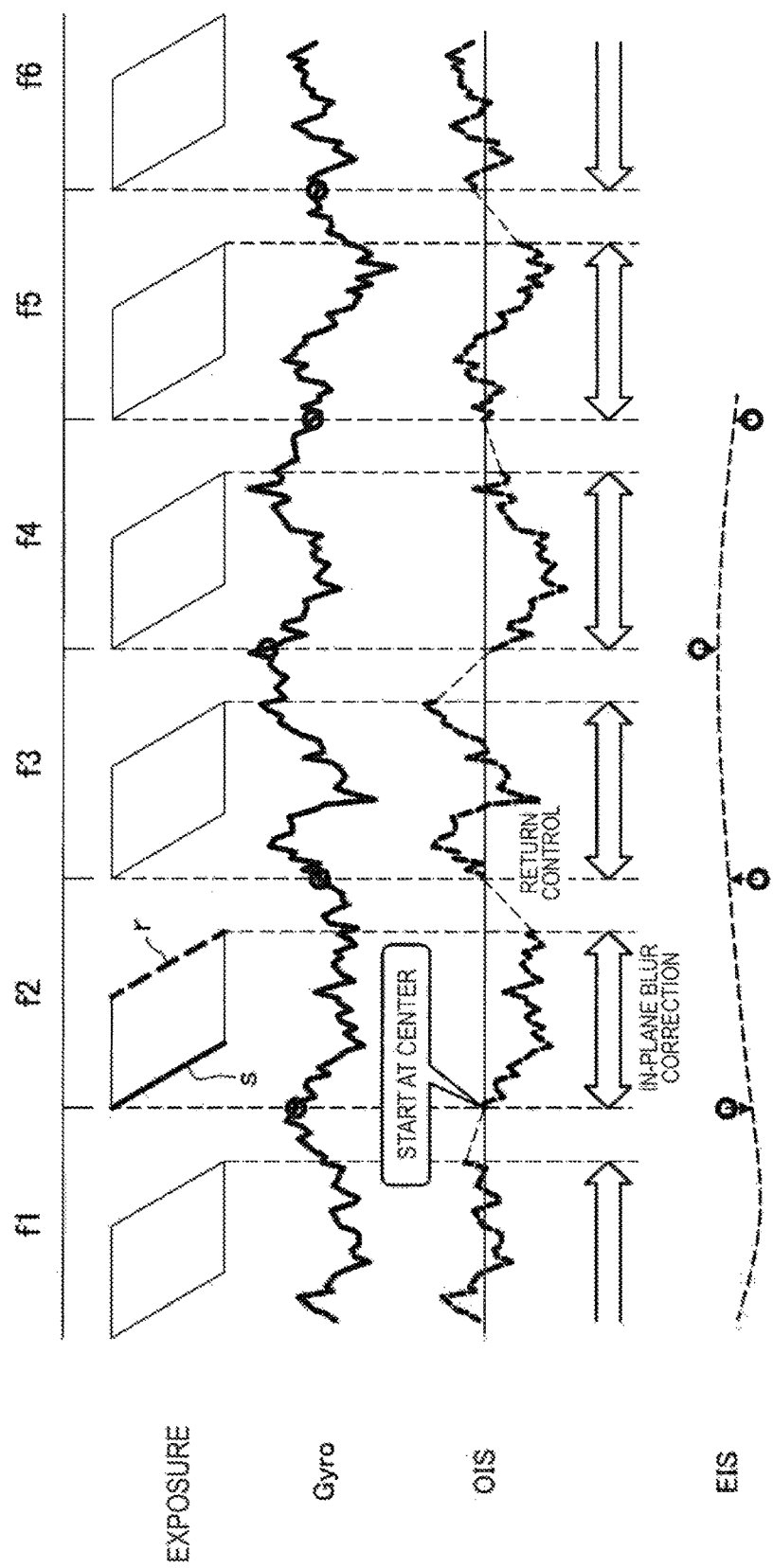
FIG. 7 is an illustration diagram showing a detailed overview of the first camera shake correction processing.

FIG. 7 is an illustration diagram showing a detailed overview of the first camera shake correction processing. FIG. 7 shows an overview of the first camera shake correction processing in six frames of frame f1 to frame f6. The waveform marked with Gyro in FIG. 7 is not the raw value of the gyro sensor showing the angular velocity but a signal waveform showing the angle obtained by integrating the raw values in the time direction.

In the first camera shake correction processing, optical camera shake correction based on the sensing data outputted by the gyro sensor 110 is performed in the interval from the start to the finish of the exposure of the image sensor 120. In the first camera shake correction processing, in the period from the finish of an exposure to the start of the exposure of the next frame, the optical camera shake correction is temporarily stopped and the centering operation of the vibration-proof lens is performed, and electronic camera shake correction of the inter-plane correction is performed using the difference value between the frames in the gyro integrated value at the timing of the start of the exposure of each frame.

Figure 8:
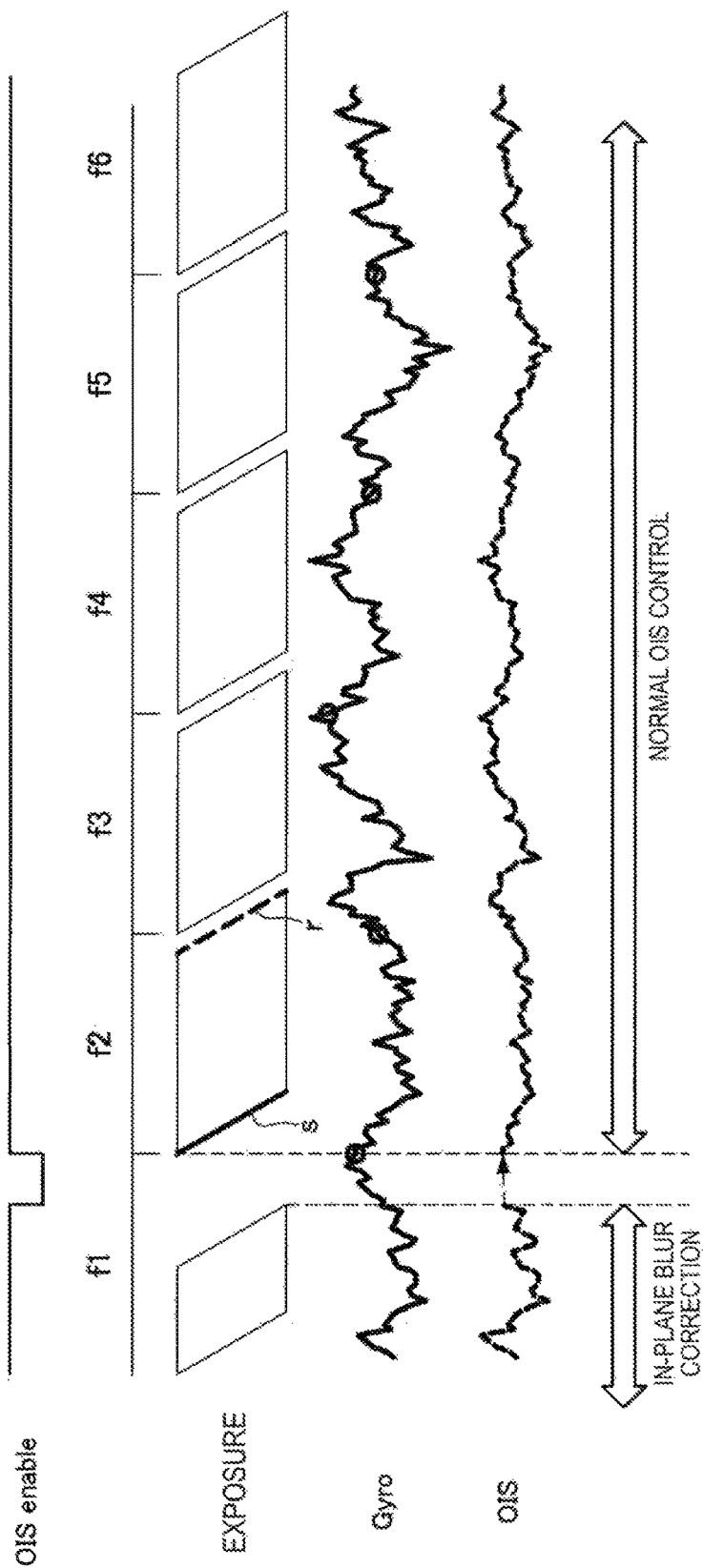
FIG. 8 is an illustration diagram showing a detailed overview of the first example of the second camera shake correction processing.

FIG. 8 is an illustration diagram showing a detailed overview of the first example of the second camera shake correction processing of which the content is different from the first camera shake correction processing. FIG. 8 shows an overview of the second camera shake correction processing in six frames of frame f1 to frame f6.

In the example shown in FIG. 8, the exposure time is longer in frame f2 and the subsequent frames than in frame f1. The image sensor 120 assesses that the centering operation in the period other than the exposure time is impossible in frame f2 and the subsequent frames, based on the longer exposure time, and keeps OIS Enable at High at all times. Therefore, in the one example of the second camera shake correction processing shown in FIG. 8, optical camera shake correction is performed at all times.

The camera shake that cannot be removed by the optical camera shake correction is corrected by electronic camera shake correction. In the case where optical camera shake correction is thus performed at all times, electronic camera shake correction is performed while the position of the vibration-proof lens obtained by the Hall element is subtracted from the sensing data sent from the gyro sensor 110. The image processing unit 12 receives, in addition to the sensing data outputted by the gyro sensor 110, information concerning the position of the Hall element from the imaging unit 11, and performs electronic camera shake correction.

Next, a second example of the second camera shake correction processing is described.

The second example of the second camera shake correction processing is processing that, even in the case where the completion of the centering of the vibration-proof lens is not possible in the period other than the exposure time, performs the centering operation in the period other than the exposure time, and performs also electronic camera shake correction in the inter-plane correction. In this case, depending on the position of the vibration-proof lens at the time of the finish of exposure, there is a possibility that the vibration-proof lens cannot be returned to the center position; thus, correction with reference to the value of the Hall element is performed at the time of electronic camera shake correction of the inter-plane correction.

Figure 9:
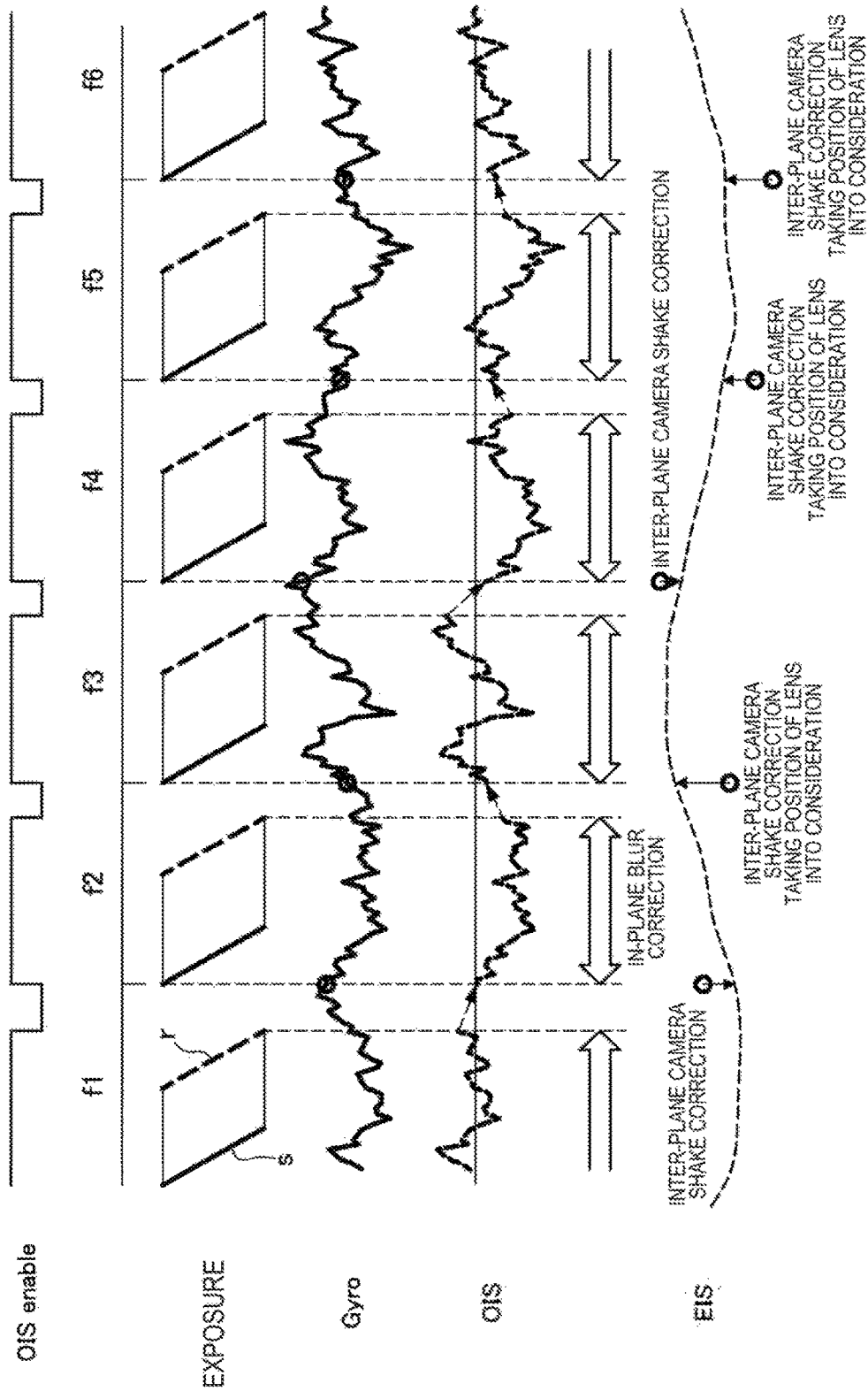
FIG. 9 is an illustration diagram showing a detailed overview of a second example of the second camera shake correction processing.

FIG. 9 is an illustration diagram showing a detailed overview of the second example of the second camera shake correction processing of which the content is different from the first camera shake correction processing. FIG. 9 shows an overview of the second camera shake correction processing in six frames of frame f1 to frame f6.

The example shown in FIG. 9 shows a situation in which the vibration-proof lens cannot be returned to the center position between frames f2 and f3, between f4 and f5, and between f5 and f6. In view of such a case where the vibration-proof lens cannot be returned to the center position, correction with reference to the value of the Hall element is performed at the time of electronic camera shake correction of the inter-plane correction.

Figure 10A:
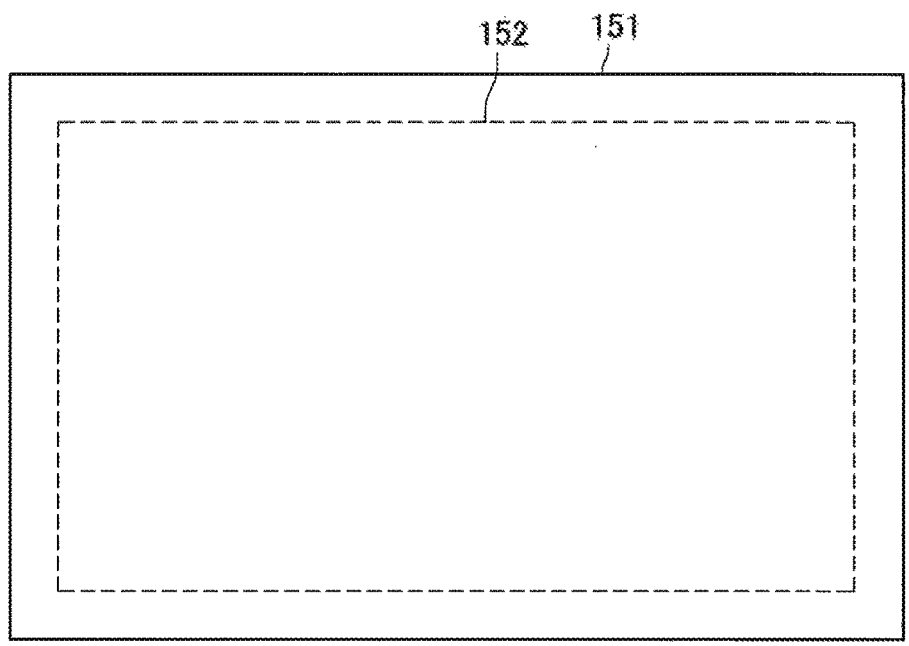
FIG. 10A is an illustration diagram showing an example of the electronic camera shake correction processing in the first camera shake correction processing.

FIG. 10A is an illustration diagram showing an example of the electronic camera shake correction processing in the first camera shake correction processing. In the electronic camera shake correction processing in the first camera shake correction processing, for example, a cut out area 152 is determined from the inside of an image 151 on the assumption that the vibration-proof lens is returned to the center position, which assumption is derived from the sensing data of the gyro sensor etc.

Figure 10B:
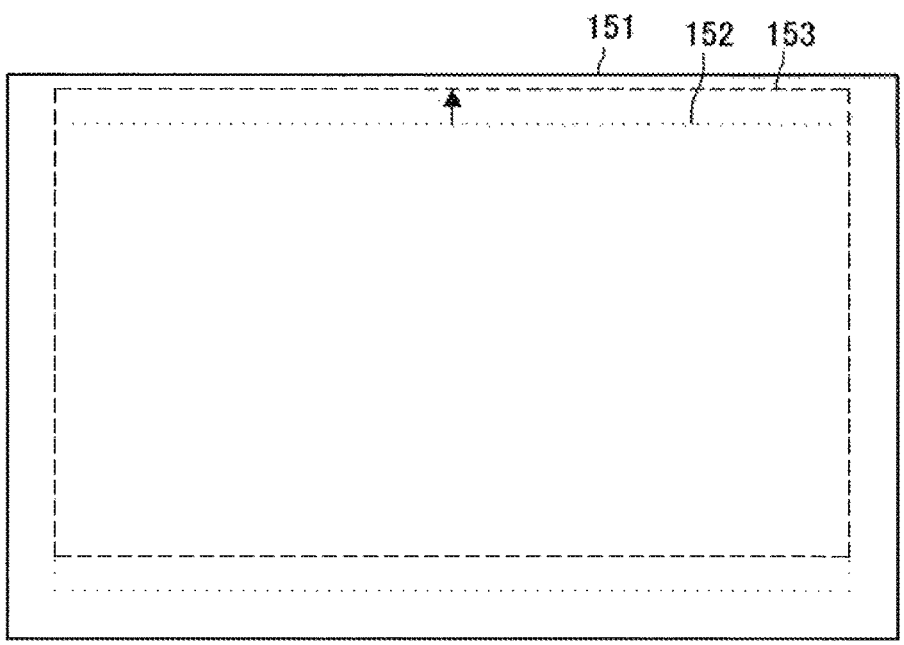
FIG. 10B is an illustration diagram showing an example of the electronic camera shake correction processing with reference to the value of a Hall element in the second example of the second camera shake correction processing.

FIG. 10B is an illustration diagram showing an example of the electronic camera shake correction processing with reference to the value of the Hall element in the second example of the second camera shake correction processing. In the electronic camera shake correction processing in the second example of the second camera shake correction processing, for example, a cut out area 153 is determined from the inside of the image 151 with reference to the sensing data of the gyro sensor etc. and the value of the Hall element. The cut out area 153 has a range that is shifted from the cut out area 152 by a prescribed amount in accordance with the value of the Hall element.

Finally, a third example of the second camera shake correction processing is described.

The third example of the second camera shake correction processing is processing that, in the case where the completion of the centering of the vibration-proof lens is not possible in the period other than the exposure time, does not perform optical camera shake correction but performs only electronic camera shake correction.

Figure 11:
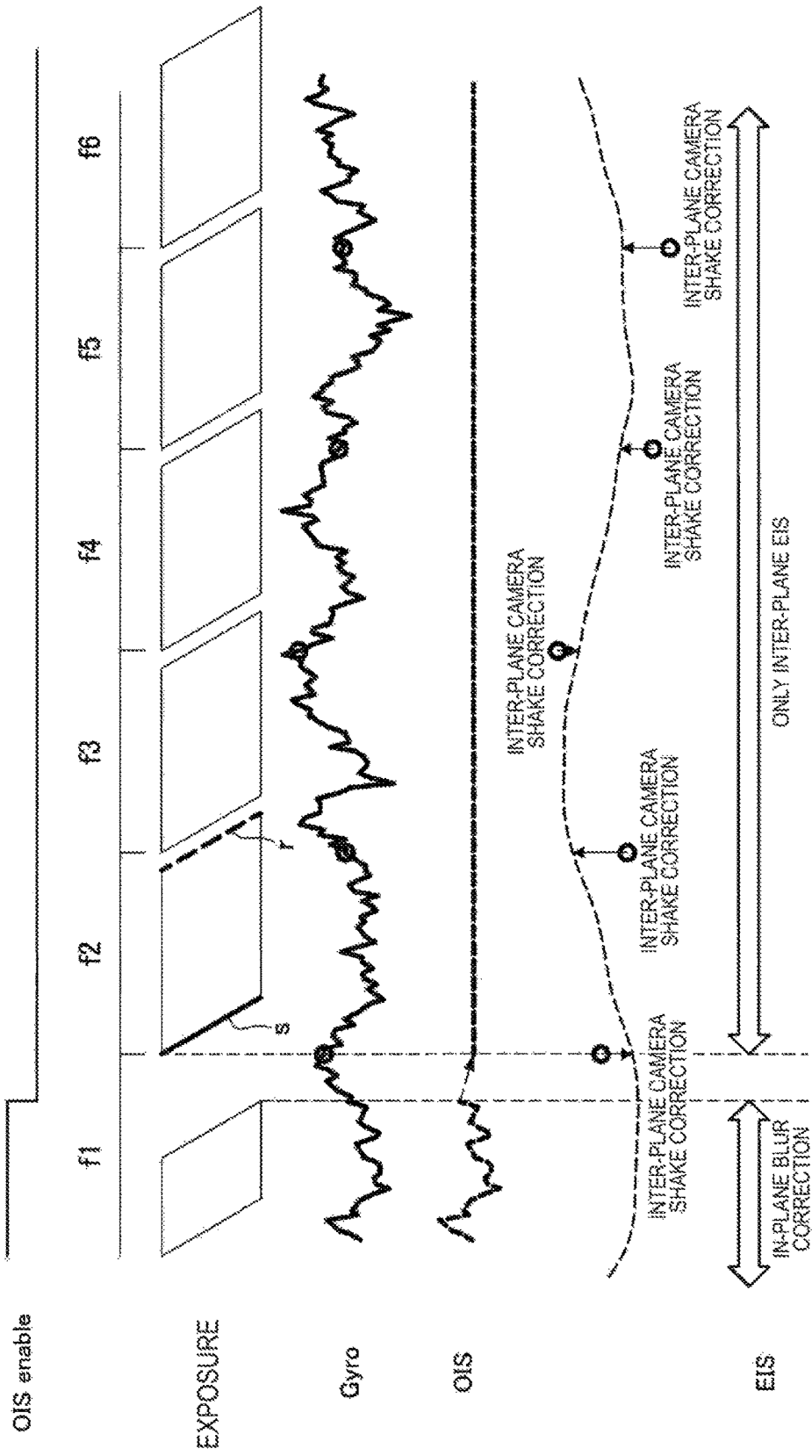
FIG. 11 is an illustration diagram showing a detailed overview of a third example of the second camera shake correction processing.

FIG. 11 is an illustration diagram showing a detailed overview of the third example of the second camera shake correction processing of which the content is different from the first camera shake correction processing. FIG. 11 shows an overview of the second camera shake correction processing in six frames of frame f1 to frame f6.

In the example shown in FIG. 11, the exposure time is different between frame f1, and frame f2 and the subsequent frames. That is, the exposure time is longer in frame f2 and the subsequent frames than in frame f1. In frame f2 and the subsequent frames, the completion of the centering of the vibration-proof lens is not possible in the period other than the exposure time due to the longer exposure time.

In such a case, in the third example of the second camera shake correction processing, optical camera shake correction is stopped, and only electronic camera shake correction is executed. That is, the image sensor 120 continues to keep signal OIS Enable at Low, and the driver 130 causes the driving of the actuator 140 to be stopped.

In the third example of the second camera shake correction processing, electronic camera shake correction is executed as the inter-plane correction. In this example, the electronic camera shake correction may be performed on the basis of the sensing data outputted by the gyro sensor 110. However, even when optical camera shake correction is stopped, the vibration-proof lens is influenced by disturbance, and is therefore difficult to completely immobilize. Hence, the electronic camera shake correction may take into consideration not only the sensing data outputted by the gyro sensor 110 but also the value of the Hall element.

In the above, the second camera shake correction processing of which the content is different from the first camera shake correction processing is described with three examples. The imaging unit 11 may determine which to use as the second camera shake correction processing on the basis of, for example, the length of the exposure time, or may determine it on the basis of the setting by the user. In the case of determination based on the length of the exposure time, the imaging unit 11 may determine the content of the second camera shake correction processing in the order of the second example, the first example, and the third example described above as the exposure time becomes longer, for example.

<2. Conclusions>

As described hereinabove, an embodiment of the present disclosure provides the electronic apparatus 10 including the imaging unit 11 that performs, during the normal period, the first camera shake correction processing that performs optical camera shake correction as the in-plane correction, performs electronic camera shake correction as the inter-plane correction, and performs the centering operation of the vibration-proof lens in the period other than the exposure time, and that performs, in the case where the exposure time is long and the centering operation of the vibration-proof lens cannot be completed, the second camera shake correction processing of which the content is different from the first camera shake correction processing.

As the second camera shake correction processing, the imaging unit 11 may perform the processing of controlling the vibration-proof lens on the basis of the sensing data of the gyro sensor also in the period other than the exposure time, may perform the centering operation of the vibration-proof lens in the period other than the exposure time and perform processing taking the position of the vibration-proof lens into consideration in electronic camera shake correction, and may stop optical camera shake correction and perform only electronic camera shake correction.

According to this embodiment, during the imaging of moving images and during the continuous imaging of still images, optical camera shake correction is performed as the in-plane correction and thereby the in-plane blur and the rolling shutter distortion can be reduced, and the inter-plane shift can be suppressed with high accuracy.

Furthermore, while common technology cannot complete the centering operation of the vibration-proof lens and cannot perform camera shake correction effectively in, for example, a dark scene with an exposure time longer than $\frac{1}{60}$ seconds, this embodiment can perform camera shake correction processing favorably by switching the content of camera shake correction processing in accordance with the length of the exposure time. The technology according to this embodiment is very effective particularly in an imaging mode that supports a very dark scene at a frame rate of not 60 fps but 30 fps.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a storage medium having the computer program stored therein. Moreover, by configuring respective functional blocks shown in a functional block diagram as hardware or hardware circuits, the hardware or hardware circuits can achieve a series of processes.

It should be understood by those skilled in the art that various modifications, combinations, sub-combinations and alterations may occur depending on design requirements and other factors insofar as they are within the scope of the appended claims or the equivalents thereof.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An image stabilization device including:
   a control unit configured to perform first camera shake correction processing based on an optical camera shake correction method using a lens and second camera shake correction processing based on an electronic camera shake correction method of cutting out a captured image,
   wherein, in a case where an exposure time satisfies a condition, the control unit operates in a first camera shake correction mode in which a centering operation of returning the lens to a center position at a time point of start of each frame is performed in a period other than the exposure time and then the first camera shake correction processing is performed in the exposure time, and the second camera shake correction processing is performed in the period other than the exposure time, and in a case where the exposure time does not satisfy the condition, the control unit operates in a second camera shake correction mode different from the first camera shake correction mode.

(2) The image stabilization device according to (1), wherein the control unit operates so as to, as the second camera shake correction mode, perform not the centering operation but the first camera shake correction processing and perform the second camera shake correction processing in the period other than the exposure time.

(3) The image stabilization device according to (1), wherein the control unit operates so as to, as the second camera shake correction mode, perform the centering operation in the period other than the exposure time and then perform the first camera shake correction processing in the exposure time, and perform, when performing the second camera shake correction processing in the period other than the exposure time, the second camera shake correction processing taking a difference between a position of the lens and the center position at the time point of start of each frame into consideration.

(4) The image stabilization device according to (1), wherein the control unit operates so as to, as the second camera shake correction mode, perform only the second camera shake correction processing while fixing the lens to the center position.

(5) The image stabilization device according to any one of (1) to (4), wherein the condition is that it be possible to return the lens to the center position at the time point of start of each frame through the centering operation.

(6) An image stabilization method including:
   assessing whether an exposure time satisfies a condition or not; and
   in a case of satisfying the condition, operating in a first camera shake correction mode in which a centering operation of returning a lens to a center position at a time point of start of each frame is performed in a period other than the exposure time and then first camera shake correction processing based on an optical camera shake correction method using the lens is performed in the exposure time, and second camera shake correction processing based on an electronic camera shake correction method of cutting out a captured image is performed in the period other than the exposure time, and in a case of not satisfying the condition, operating in a second camera shake correction mode different from the first camera shake correction mode.

(7) An electronic apparatus including:
   the image stabilization device according to any one of (1) to (5).

What is claimed is:

1. An image stabilization device comprising:
   a control unit configured to perform first camera shake correction processing based on an optical camera shake correction method using a lens and second camera shake correction processing based on an electronic camera shake correction method of cutting out a captured image, wherein
   in a case where an exposure time satisfies a condition, the control unit operates in a first camera shake correction mode in which a centering operation of returning the lens to a center position at a time point of start of each frame is performed in a period other than the exposure time and then the first camera shake correction processing is performed in the exposure time, and the second camera shake correction processing is performed in the period other than the exposure time, and
   in a case where the exposure time does not satist the condition, the control unit operates in a second camera shake correction mode different from the first camera shake correction mode, and
   the condition is based on whether it is possible to return the lens to the center position at the time point of start of each frame through the centering operation.

2. The image stabilization device according to claim 1, wherein the control unit operates so as to, as the second camera shake correction mode, perform not the centering operation but the first camera shake correction processing and perform the second camera shake correction processing in the period other than the exposure time.

3. The image stabilization device according to claim 1, wherein the control unit operates so as to, as the second camera shake correction mode, perform the centering operation in the period other than the exposure time and then perform the first camera shake correction processing in the exposure time, and perform, when performing the second camera shake correction processing in the period other than the exposure time, the second camera shake correction processing taking a difference between a position of the lens and the center position at the time point of start of each frame into consideration.

4. The image stabilization device according to claim 1, wherein the control unit operates so as to, as the second camera shake correction mode, perform only the second camera shake correction processing while fixing the lens to the center position.

5. An electronic apparatus comprising:
   the image stabilization device according to claim 1.

6. An image stabilization method comprising:
   assessing whether an exposure time satisfies a condition or not; and
   in a case of satisfying the condition, operating in a first camera shake correction mode in which a centering operation of returning a lens to a center position at a time point of start of each frame is performed in a period other than the exposure time and then first camera shake correction processing based on an optical camera shake correction method using the lens is performed in the exposure tune, and second camera shake correction processing based on an electronic camera shake correction method of cutting out a captured image is performed in the period other than the exposure time, and in a case of not satisfying the condition, operating in a second camera shake correction mode different from the first camera shake correction mode, wherein the condition is based on whether it is possible to return the lens to the center position at the time point of start of each frame through the centering operation.

7. An electronic device comprising:

circuitry configured to perform first camera shake correction processing based on an optical camera shake correction method using a lens and second camera shake correction processing based on an electronic camera shake correction method of cutting out a captured image;

in a case where an exposure time satisfies a condition that is based on whether it is possible to return the lens to a center position at a time point of start of each frame through a centering operation, operate in a first camera shake correction mode in which the centering operation of returning the lens to the center position at a time point of start of each frame is performed in a period other than the exposure time and then the first camera shake correction processing is performed in the exposure time, and the second camera shake correction processing is performed in the period other than the exposure time; and operate in a second camera shake correction mode different from the first camera shake correction mode in a case where the exposure time does not satisfy the condition.

8. The electronic device of claim 7, wherein the circuitry is configured to operate so as to, as the second camera shake correction mode, perform not the centering operation hut the first camera shake correction processing and perform the second camera shake correction processing in the period other than the exposure time.

9. The electronic device of claim 7, wherein the circuitry is configured to:

operate so as to, as the second camera shake correction mode, perform the centering operation in the period other than the exposure time and then perform the first camera shake correction processing in the exposure time; and perform, when performing the second camera shake correction processing in the period other than the exposure time, the second camera shake correction processing taking a difference between a position of the lens and the center position at the time point of start of each frame into consideration.

10. The electronic device of claim 7, wherein the circuitry operates so as to, as the second camera shake correction mode, perform only the second camera shake correction processing while fixing the lens to the center position.

* * * * *